R. COPP.
PISTON RING.
APPLICATION FILED MAR. 28, 1919.
1,365,640.
Patented Jan. 11, 1921.
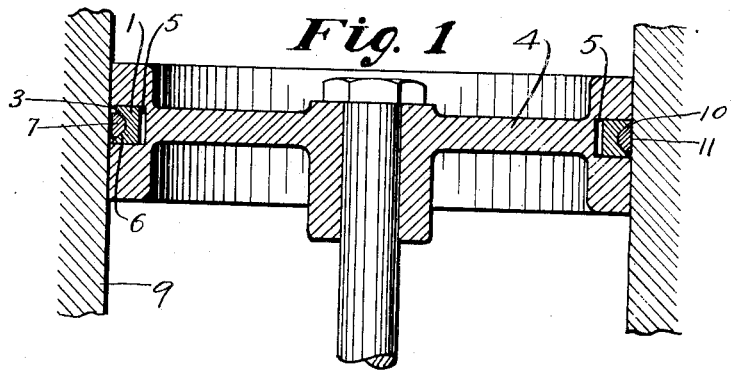
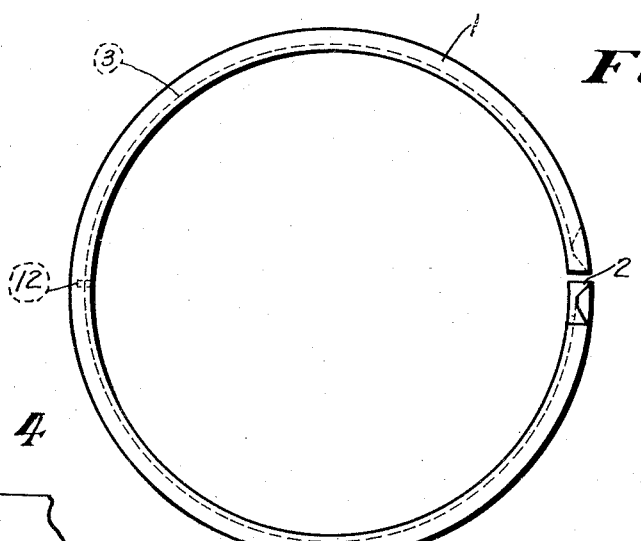
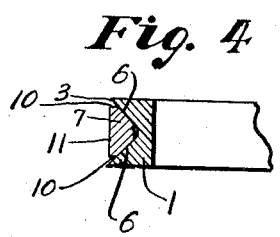
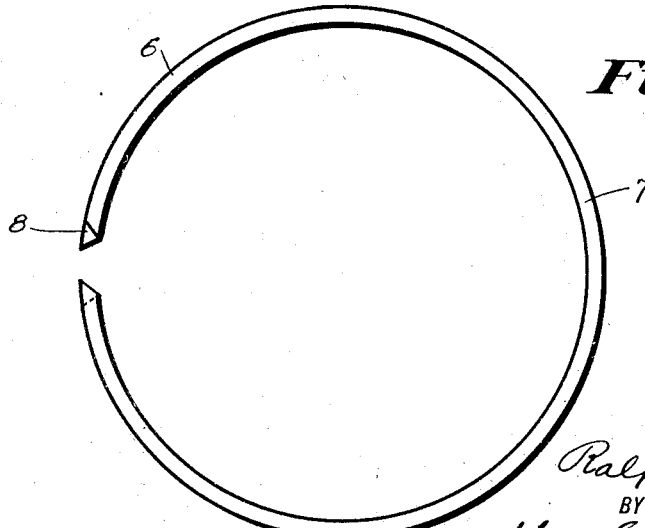
INVENTOR:
Ralph Copp,
BY
Hugh K. Wagner,
ATTORNEY.

UNITED STATES PATENT OFFICE.

RALPH COPP, OF ST. LOUIS, MISSOURI.

PISTON-RING.

1,365,640.

Specification of Letters Patent.　　Patented Jan. 11, 1921.

Application filed March 28, 1919. Serial No. 285,817.

*To all whom it may concern:*

Be it known that I, RALPH COPP, a citizen of the United States residing at the city of St. Louis, in the State of Missouri, have invented certain new and useful Improvements in Piston-Rings, of which the following is a specification.

This invention relates to piston heads and rings and to improved means for mounting piston rings on piston heads for use in cylinders where the piston is operated by fluid or liquid pressure or the like, and is adapted, for instance, for use in connection with pistons of milk pumps, water pumps, ammonia compressors, internal combustion engines, steam engines, etc., and the present invention relates more particularly to improvements in my invention described in my application for United States patent Serial Number 277,353, filed February 15, 1919.

The present invention has for its object to provide an improved cage or holder of simple construction adapted for mounting the piston ring, such, for instance, as the piston ring described in my said application for patent Serial Number 277,353, in operative position in association with a piston head of ordinary construction having the usual piston ring groove ordinarily provided in piston heads.

My said invention described in my said application for patent Serial Number 277,353 provides a groove of special construction formed in the cylinder head, and the present invention herein described obviates the necessity of this groove formed in the piston head and provides a cage or piston ring holder whereby a piston ring, such as the piston ring of my said former invention (application Serial No. 277,353), may be conveniently associated with a piston head of ordinary construction, as hereinabove stated.

An advantage of the present invention is that no change need be made in the construction of any ordinary piston head when it is desired to equip the same with a piston ring such as my said improved piston ring described in my application for United States patent Serial Number 277,353.

Other objects and advantages of the present invention are described in this specification, and are set forth in the claim.

In the accompanying drawings forming part of this specification, in which like numbers of reference denote like parts wherever they occur, Figure 1 is a sectional view of the device of this invention operatively associated with a cylinder and piston head, a fragmentary section of the cylinder being depicted in the drawing;

Fig. 2 is a plan view looking down upon the piston ring cage or holder, same being removed from the piston head, and the ring being removed from the cage;

Fig. 3 is a plan view of the piston ring removed from the cage; and

Fig. 4 is an enlarged cross-sectional view of a fragment of the piston ring cage with the piston ring in association therewith, the parts being removed from the cylinder and piston head.

Cage or holder 1, of any suitable material, and having a transverse cut 2 therethrough so as to make the said cage a spring ring, is provided with an outwardly-flared annular groove 3 formed in its outer face, said groove 3 being substantially V-shaped in cross-sectional view, said cage or holder 1 being adapted to be mounted on piston head 4 in the usual piston ring groove 5, such, for instance as the groove 5 in Fig. 1.

V-shaped groove 3 is an annular groove formed in the outer face of cage 1, and is adapted to seat therein the beveled edges 6 of transversely-split spring-ring piston ring 7 shown in Fig. 3 and being similar in important features to my improved piston ring heretofore described in detail in my said prior application for patent Serial Number 277,353, the transverse split 8 in piston ring 7 being of any suitable form adapted to completely sever the annular continuity of ring 7, and being adapted for the well-known purpose of the friction surface of the piston ring 7 to bear against the adjacent inner wall of cylinder 9 to form a sealing contact therewith, and, also, facilitates mounting piston ring 6 in groove 3 of cage 1.

Piston ring 7 may be substantially truncated triangle-shaped or wedge-shaped in cross-sectional view, as best seen in Fig. 4, and may be rimmed with straight edges 10 adjacent its peripheral face 11, which face constitutes the friction surface of the piston ring 7.

The beveled edges 6 of piston ring 7 form the bearing surfaces adapted to engage slidably, upwardly, and downwardly of adjacent portions of the inclined sides of V-shaped groove 3 of cage 1 substantially as shown in Figs. 1 and 4, as the spring tension of said piston ring 6 causes the friction surface of the piston ring to be adjusted against the adjacent inner walls of the cylinder 9, the circumferential movement of said piston ring 6, mounted in said groove 3 as above described, being limited in a well-known manner by means of pin 12 or the like borne by cage 1 in groove 3 thereof in some suitable positions, such, for instance, as that opposite transverse cut 2 of said cage 1, as shown in Fig. 2, so that when piston ring 7 is mounted in groove 3 of cage 1 with pin 12 in transverse cut 8 of piston ring 7, said pin 12 will engage a cut end of said piston ring 7 and will limit the circumferential movement of the piston ring in the said groove 3 and prevent the gap formed by transverse cut 8 of piston ring 7 from coinciding with the gap formed by transverse cut 2 of cage 1.

The construction of parts of the present invention provides that, by means of the said cage 1 bearing in its groove 3 the piston ring 7, said piston ring may be associated readily, conveniently, and simply with a piston head 4 of ordinary construction by adjusting said case 1 in the usual groove 5 of the said piston head, and thus the said ring may be operatively associated with any piston head without altering the construction of the said piston, transverse cuts 2 and 8 facilitating the mounting of cage 1 bearing piston ring 7 in groove 5 of piston head 4, and when said piston ring, 7, borne in V-shaped groove 3 of cage 1, is operatively associated with piston head 4 by mounting the said cage 1 in groove 5 of said piston head 4 in a cylinder 9, as shown in Fig. 1, the said piston ring operates to form a sealing joint against the adjacent inner wall of the said cylinder, and the said sealing joint will at all times be perfectly adjusted with reference to the slidable engagement of the piston ring with the said inner wall of the cylinder to form a leak-proof joint against the passage of fluid or the like, substantially as described in my said prior invention set forth in detail in my said application for United States Patent Serial No. 277,353, but, in addition, the spring tension of the transversely-split cage 1 of my present invention acts as an auxiliary force to aid in forming said leak-proof joint.

The groove 3 described in the present invention and borne by cage 1 serves similar purposes and has substantially similar functions with reference to a piston ring 7 operatively mounted in functioning position shown in Fig. 1 as does the similarly-shaped groove (not shown herein), which is shown and described in my said application for United States Patent Serial Number 277,353, as borne by and formed in the peripheral face of the piston head.

The opposite walls of the groove in the split ring incline inwardly and terminate in a vertical wall, which forms the bottom of the groove. The opposite surfaces of the split ring incline inwardly and terminate in a vertical wall, the inclination of the surfaces being the same as that of the walls of the groove, while the inner vertical walls are spaced apart to provide for adjustment between the rings. The outer portions of the opposite inclined surfaces of the split ring merge into substantially horizontal portions, which terminate with the outer vertical face of said ring.

This construction affords two outer annular pockets to take up any foreign substance or loose oil working up between the piston and the cylinder wall.

Having thus described this invention, I hereby reserve the benefit of all changes in form, arrangement, order, or use of parts, as it is evident that many minor changes may be made therein without departing from the spirit of this invention or the scope of the following claim.

I claim:

The combination with the piston having a groove therein, a split ring having a snug fit in said groove and provided with a groove in its outer face, the opposite walls of said groove being inclined inwardly toward each other and terminating at and joining a vertical wall which forms the bottom of said groove, a second split ring, the outer opposite surfaces of which incline inwardly toward the inner side, the inclination corresponding to the inclination of the walls of the groove in the first mentioned split ring, the incline surfaces of the second mentioned split ring terminating at the ends of a vertical inner wall, and the outer ends of said inclined surfaces terminating in substantially horizontal portions which extend to the outer flat surface of the second mentioned split ring, the horizontal portions forming annular pockets with the inclined walls of the groove in the first mentioned split ring, and the inner vertical wall of the second ring being normally spaced from the bottom wall of the groove, thereby forming a space for adjustment of the second mentioned ring when wear between the parts occurs.

In testimony whereof I hereunto affix my signature.

RALPH COPP.